United States Patent Office 3,116,295
Patented Dec. 31, 1963

3,116,295
PROCESS FOR THE PRODUCTION OF
DIHYDROQUINACRIDONES
Werner Zerweck, Frankfurt am Main, Heinrich Ritter, Dornigheim, Kreis Hanau, and Erwin Herrmann, Frankfurt am Main, Germany, assignors to Cassella Farbwerke Mainkur Aktiengesellschaft, Frankfurt am Main, Germany, a company of Germany
No Drawing. Filed July 3, 1961, Ser. No. 121,320
Claims priority, application Germany July 9, 1960
7 Claims. (Cl. 260—279)

This invention relates to a new process for the production of dihydroquinacridones which are useful intermediate compounds for preparing coloring matters and especially pigments.

The process of the present invention consists in heating 2,5-diarylamino-3,6-dihydroterephthalic acid dialkyl esters in a suitable pressure vessel with hydrofluoric acid having a concentration between 60 and 100% by weight of hydrogen fluoride to a temperature between about 120- and 180° C. The reaction takes place according to the following equation:

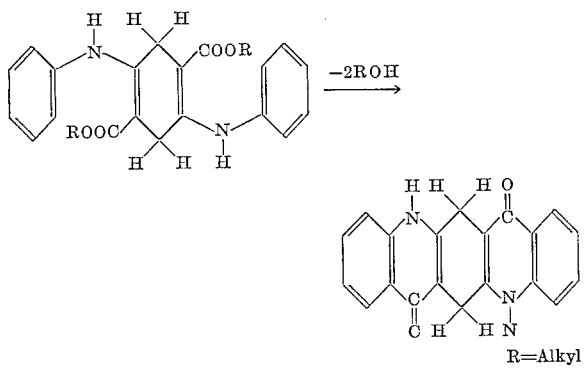

R=Alkyl

In accordance with this process, the yields of dihydroquinacridones that are thus obtained are good and they have a high degree of purity.

The conversion of 2,5-diarylamino-3,6-dihydroterephthalic acid esters into the corresponding dihydroquinacridones by heating the former in a solvent having a high boiling point, such as a mixture of diphenyl and diphenyl ether, in a nitrogen atmosphere at a temperature of 250–260° C. has been described in the United States Patent No. 2,821,529. This method, however, is less advantageous than the process of the present invention because of the high reaction temperature required.

The following examples are given for the purpose of illustrating the present invention but the invention is not restricted to these examples. All parts given are to be understood to be parts by weight and all temperature degrees, to be degrees on the centigrade scale.

Example 1

20 parts of 2,5'-dianilino-3,6-dihydroterephthalic acid diethyl ester are introduced into 100 parts of anhydrous hydrofluoric acid that had been preliminarily cooled to 0–10° and the mixture is heated in a steel autoclave for 2 hours at a temperature of 140–150°. After cooling to about 40° the excess hydrofluoric acid is distilled off, the residue is admixed with iced water, filtered off with suction, thoroughly washed with water and dried at 60°.

Yield: 12.6 parts (=82% of the theoretical) of linear 6,13-dihydroquinacridone in the form of a pale brown powder.

Example 2

10 parts of 2,5-di-(p-toluidino)-3,6-dihydroterephthalic acid diethyl ester are incorporated into 60 parts of 80% hydrofluoric acid which has been cooled to 0–10° and the mixture is heated in a nickel autoclave for 2 hours at a temperature of 150–160°. After recovering the product as described in Example 1, 2,9-dimethyl-6,13-dihydroquinacridone is obtained in the form of a pale pink powder.

Yield: 5.6 parts (=70% of the theoretical).

Example 3

15 parts of 2,5-di-(p-chloroanilino)-3,6-dihydroterephthalic acid diethyl ester are introduced into 100 parts of anhydrous hydrofluoric acid precooled to 0–10° and the mixture is then heated in a steel autoclave for 3 hours at a temperature of 140–150°. After recovering the product as described in Example 1, 2,9-dichloro-6,13-dihydroquinacridone is obtaind in the form of a pale pink powder.

Yield: 9.7 parts (=80% of the theoretical).

Example 4

100 parts of the diethyl ester of 2,5-di-(p-anisidino)-3,6-dihydroterephthalic acid are introduced into 900 parts of anhydrous hydrofluoric acid precooled to 0–10° and then heated in a steel autoclave for 3 hours at a temperature of 140–150°. After cooling down to about 40°, the excess hydrofluoric acid is distilled off, the residue is admixed with iced water, filtered off with suction, thoroughly washed with water and dried at 60°.

Yield: 72.3 parts (=90% of the theoretical) of 2,9-dimethoxy-6,13-dihydroquinacridone in the form of a pale red-violet powder.

It will be understood that this invention is susceptible to further modification and, accordingly, it is desired to comprehend such modifications within this invention as may fall within the scope of the appended claims.

We claim:
1. A process for the production of a dihydroquinacridone which comprises heating at a temperature between 120 and 180° C. a mixture of concentrated hydrofluoric acid and a di(lower alkyl) ester of a 2,5-bis(phenylamino)-3,6-dihydroterephthalic acid of the group consisting of di(lower alkyl) esters of 2,5-dianilino-, 2,5-di-p-toluidino-, 2,5-di-p-chloroanilino-, and 2,5-di-p-anisidino-3,6-dihydroterephthalic acids, and subsequently recovering the resulting dihydroquinacridone.

2. A process as defined in claim 1 in which the di(lower alkyl) ester of the 2,5-bis(phenylamino)-3,6-dihydroterephthalic acid is diethyl 2,5-dianilino-3,6-dihydroterephthalate.

3. A process as defined in claim 1 in which the di(lower alkyl) ester of the 2,5-bis(phenylamino)-3,6-dihydroterephthalic acid is diethyl 2,5-di-p-toluidino-3,6-dihydroterephthalate.

4. A process as defined in claim 1 in which the di(lower alkyl) ester of the 2,5-bis(phenylamino)-3,6-dihydroterephthalic acid is diethyl 2,5-di-p-chloroanilino-3,6-dihydroterephthalate.

5. A process as defined in claim 1 in which the di-(lower alkyl) ester of the 2,5-bis(phenylamino)-3,6-dihydroterephthalic acid is diethyl 2,5-di-p-anisidino-3,6-dihydroterephthalate.

6. A process as defined in claim 1 in which the concentrated dihydrofluoric acid is anhydrous hydrogen fluoride.

7. A process as defined in claim 1 in which the concentrated hydrofluoric acid contains at least 60 percent by weight of hydrogen fluoride.

References Cited in the file of this patent

UNITED STATES PATENTS

| | | |
|---|---|---|
| 2,174,118 | Calcott et al. | Sept. 26, 1939 |
| 2,821,530 | Struve | Jan. 28, 1958 |

FOREIGN PATENTS

| | | |
|---|---|---|
| 1,245,971 | France | Oct. 3, 1960 |

OTHER REFERENCES

Uhlig: Angewandte Chemie, volume 66, pages 435–436.
Liebermann: Liebig's Annalen, volume 518, pages 245–259 (1935) (page 246 relied on).